United States Patent [19]

Galla et al.

[11] Patent Number: 4,904,629

[45] Date of Patent: Feb. 27, 1990

[54] QUATERNARY TRIETHYLENEDIAMINE COMPOSITIONS AND THEIR COMBINATION WITH TERTIARY AMINES FOR DELAYED ACTION/ENHANCED CURING CATALYSTS IN POLYURETHANE SYSTEMS

[75] Inventors: Edward A. Galla, Macungie; Robert L. Ricci, Allentown; Gary D. Andrew, Walnutport, all of Pa.

[73] Assignee: Air Products and Chemicals, Inc., Allentown, Pa.

[21] Appl. No.: 226,330

[22] Filed: Jul. 29, 1988

Related U.S. Application Data

[60] Division of Ser. No. 927,897, Nov. 6, 1986, Pat. No. 4,785,025, which is a continuation-in-part of Ser. No. 710,181, Mar. 11, 1985, abandoned, which is a continuation-in-part of Ser. No. 670,705, Nov. 13, 1984, Pat. No. 4,582,861.

[51] Int. Cl.$^4$ ................. C04G 19/14; B01J 31/00
[52] U.S. Cl. ........................... 502/164; 540/472
[58] Field of Search ............... 502/164; 540/472; 521/115, 118, 902; 528/54, 49

[56] References Cited

U.S. PATENT DOCUMENTS

| | | | |
|---|---|---|---|
| 3,010,963 | 11/1961 | Erner | 260/268 |
| 3,050,477 | 8/1962 | Gnitter et al. | 260/2.5 |
| 3,087,912 | 4/1963 | Wagner et al. | 260/67 |
| 3,476,933 | 11/1969 | Mendelsohn | 260/2.5 |
| 3,582,861 | 4/1969 | Galla et al. | 521/118 |
| 3,824,199 | 7/1974 | Nadeau et al. | 260/2.5 |
| 3,892,687 | 7/1975 | Bechara et al. | 260/2.5 |
| 3,954,684 | 5/1976 | Farrissey, Jr. et al. | 502/164 |
| 3,993,652 | 11/1976 | Bechara et al. | 260/268 |
| 4,040,992 | 8/1977 | Bechara et al. | 260/2.5 |
| 4,116,879 | 9/1978 | Bechara et al. | 260/567.6 |
| 4,136,240 | 1/1979 | Zimmerman et al. | 521/115 |
| 4,148,980 | 4/1979 | Narayan | 521/115 |
| 4,186,255 | 1/1980 | Klein et al. | 521/128 |
| 4,264,486 | 4/1981 | McLaughlin | 260/33.6 |
| 4,365,025 | 12/1982 | Murch et al. | 521/159 |
| 4,365,670 | 12/1982 | McLaughlin | 166/295 |
| 4,707,501 | 11/1987 | Petrella et al. | 502/164 |
| 4,767,736 | 8/1988 | Petrella et al. | 502/164 |

FOREIGN PATENT DOCUMENTS 163757 12/1981 Japan .................... 502/164

*Primary Examiner*—John Kight
*Assistant Examiner*—Dennis R. Daley
*Attorney, Agent, or Firm*—Michael Leach; James C. Simmons; William F. Marsh

[57] ABSTRACT

A method for preparing polyurethane product by the reaction of an organic polyisocyanate with a polyester or polyether polyol in the presence of a catalytically effective amount of a catalyst system consisting essentially of a tertiary amine and 1 to 35 wt %, based on the tertiary amine, of an N-hydroxyalkyl quaternary ammonium carbonylate salt, particularly a quaternary triethylenediamine compound. The preferred quaternary composition is the reaction product of an alkylene oxide in excess of equimolar amount with triethylenediamine in the presence of an acid. The use of such catalyst system advantageously improves the cure time of the urethane reaction, when compared to a system containing solely a tertiary amine, while maintaining the same initiation of the reaction. This advantage can be transferred to a delay in the initiation time while maintaining or shortening the cure time by adjustments in the total amount of the catalyst system used.

14 Claims, No Drawings

QUATERNARY TRIETHYLENEDIAMINE COMPOSITIONS AND THEIR COMBINATION WITH TERTIARY AMINES FOR DELAYED ACTION/ENHANCED CURING CATALYSTS IN POLYURETHANE SYSTEMS

CROSS-REFERENCE TO RELATED APPLICATIONS

This application is a division of application Ser. No. 06/927,897, filed 6 Nov. 1986 now U.S. Pat. No. 4,785,025 which is a continuation-in-part of application Ser. No. 06/710,181 filed 11 Mar. 1985, now abandoned, which is a continuation-in-part of application Ser. No. 06/670,705 filed 13 Nov. 1984, now U.S. Pat. No. 4,582,861 which applications were assigned to the Assignee of the present application and are incorporated by reference.

TECHNICAL FIELD

This invention relates to the tertiary amine catalysis of reactions involving organic polyisocyanates and polyols in the production of polyurethane products.

BACKGROUND OF THE INVENTION

In the polyurethane industry there is a need for a delayed action catalyst, i.e. a catalyst that will delay the onset of the isocyanatepolyol reaction ("initiation time") while not substantially affecting the time to the end of the reaction or final cure, or that will yield the same initiation time with a shorter cure time. The problem is manifested in the production of polyurethane shoe soles where it would be desirable if the polyurethane forming composition would not begin to react until it has essentially filled the mold form while also reaching a final cured state in substantially the same or shorter time period to maintain productivity.

Past attempts to solve this problem have centered around taking the standard amine catalyst, i.e. triethylenediamine, also known as diazabicyclo-octane, and blocking it with an acid to form the simple amine salt. In theory, this approach should work well but from experimentation it failed to delay the initiation time as desired without lengthening the cure time.

U.S. Pat. No. 4,040,992 discloses the polymerization and condensation reactions of organic isocyanates are catalytically promoted by the use of N-hydroxyalkyl quaternary ammonium carbonylate salts, for example, N-hydroxypropyl trimethyl ammonium salts of carboxylic acids such as those of formic and acetic acids and of fatty acids such as hexanoic and octanoic acids and the like.

U.S. Pat. No. 3,010,963 discloses quaternary hydroxyalkyl bases and salts of triethylenediamine and imidazole.

U.S. Pat. No. 3,892,687 discloses certain acyclic quaternary hydroxyalkyl ammonium alkoxides and phenoxides useful as catalysts for making polyurethane and polyurethane-polyisocyanurate foams.

U.S. Pat. No. 3,993,652 discloses phenoxides of certain cyclic quaternary ammonium bases containing a hydroxyalkyl group attached to the hetero nitrogen as catalysts in reactions involving organic isocyanates.

U.S. Pat. No. 4,116,879 discloses the preparation of cellular polyurethane resins using as a catalyst certain quaternary hydroxyalkyl tertiary amine bases.

SUMMARY OF THE INVENTION

The present invention provides a method for the preparation of a polyurethane product by the reaction of an organic polyisocyanate with a polyester or polyether polyol in the presence of a tertiary amine catalyst, the improvement which comprises employing as the catalyst system, in addition to the tertiary amine, about 1 to 35 wt% based on the tertiary amine of a quaternary ammonium salt of triethylenediamine (TEDA) prepared by reacting greater than one mole, preferably about 1.3 to 3 moles of an alkylene oxide per mole of triethylenediamine in the presence of an acid H—A, including inorganic and organic acids.

The reaction of an alkylene oxide in excess of equimolar amounts with triethylenediamine in the presence of an acid is believed to yield mixture of quaternary compounds, the major component having the following formula I

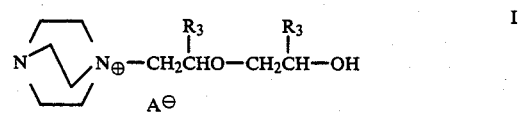

a minor component having the following formula II

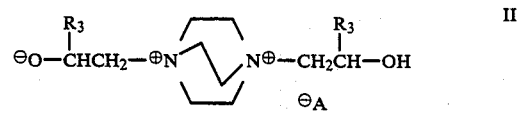

plus other minor components where $R_3$ is hydrogen, phenyl an alkyl group of 1 to 15 carbon atoms, an alkenyl group of 2 to 15 carbon atoms, an alkynyl group of 2 to 6 carbon atoms, a hydroxyalkyl group of 1 to 9 carbon atoms, a ketoalkyl group having a total of 3 to 15 carbon atoms, or an alkoxyl alkyl group having a total of 2 to 20 carbon atoms and A is the salt forming anionic portion of the acid H—A which may be an inorganic acid such as sulfuric, nitric, phosphoric, hydrochloric and the like or an organic acid.

Such reaction product compositions are another embodiment of the invention and are useful by themselves as catalysts for the reaction of an organic isocyanate with an active hydrogen containing compound, particularly polyisocyanates and polyols, and for trimerizations of the polyisocyanates.

The tertiary amine compounds to which a minor amount of quaternary ammonium salt of TEDA is added according to the invention are those tertiary amines typically used in the art for the preparation of polyurethane products.

As an advantage of the invention, the catalyst systems, when used in the reaction of organic polyisocyanate compounds with polyether or polyester polyols, provide a decrease in cure time while maintaining substantially the same initiation time when the catalyst system is used at about the same level as the tertiary amine by itself in the polyurethane reaction.

A further advantage is an increase in the initiation time while maintaining substantially the same cure, or demold, time at total catalyst levels which are lower than that for the tertiary amine alone.

DETAILED DESCRIPTION OF THE INVENTION

The method for preparing polyurethane product according to the invention involves the use of a particular catalyst system which consists essentially of a tertiary amine which catalyzes the isocyanate-polyol reaction and 1 to 35 wt%, preferably 3 to 25 wt%, based on tertiary amine, of a quaternary ammonium mono-salt of triethylenediamine prepared by reacting triethylenediamine with excess alkylene oxide, especially about 30 to 200% excess alkylene oxide, on a molar basis. The reaction is performed in the presence, preferably of an equimolar amount, of an acid, preferably organic acid, or such acid may be added subsequently, to afford the carbonylate salt.

Exemplary of the tertiary amines which can be used in the catalyst composition are those amines having the following general formula III

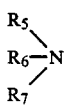   III where:

$R_5$, $R_6$ and $R_7$ are independently alkyl or hydroxyalkyl groups of 1 to 20 carbon atoms, or cycloalkyl groups of 3 to 8 carbon atoms, aralkyl, aryl, alkenyl of 2 to 20 carbon atoms or alkynyl groups of 2 to 6 carbon atoms, or $R_5$, $R_6$ and $R_7$ together with the nitrogen atom form an N-substituted heterocyclic 5 to 7 atom ring structure, examples of which include triethylenediamine, methyl triethylenediamine, quinuclidine, N-methyl morpholine, N-ethyl morpholine, N,N'-dimethyl piperazine and 1,8-diazo-bicyclo(5,4,0)-undecene-7.

In addition to the heterocyclic amines just mentioned, other suitable tertiary amines include trimethylamine, dimethylethylamine, N-dimethyl-N-hydroxyethylamine, N-benzyl-N-dimethylamine, N-di(hydroxyethyl)-N-phenylamine, triethanolamine, N-cyclohexyl-N-dimethylamine, and bis(dimethylaminoethyl)ether. The preferred tertiary amines are triethylenediamine (TEDA), especially when the catalyst system is used in a polyurethane shoe sole formulation, and dimethylethanolamine (DMEA) combined with bis(dimethylaminoethyl)ether (BDMAEE) in a ratio of 5-8 parts DMEA per part of BDMAEE, especially a ratio of 6-7:1, when the catalyst system is used in a rigid appliance polyurethane foam system.

The preferred route for the preparation of the quaternary triethylenediamine monocarbonylate salts used in the invention is by reaction of triethylenediamine with from about 30 to 200% molar excess of an alkylene oxide, desirably about 100% molar excess, in the presence of the chosen acid, especially an organic carboxylic acid. In other words one mole of triethylenediamine is reacted with about 1.3 to 3 moles, desirably about 2 moles, of alkylene oxide. If the corresponding quaternary compound is available as the hydroxide or alkoxide, formation of the desired carbonylate can be directly obtained by reaction of such quaternary ammonium base with the desired acid. Preparation of hydroxyalkyl quaternary ammonium carbonylates is more fully described in U.S. Pat. No. 4,040,992 which is incorporated by reference.

Contemplated as the functional equivalent for triethylenediamine for purposes of this invention is methyl triethylenediamine.

The alkylene oxides that can be reacted with triethylenediamine can be represented by general formula IV:

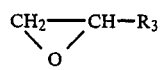   IV where:

$R_3$ is hydrogen, phenyl, an alkyl group of 1 to 15 carbon atoms, an alkenyl group of 2 to 15 carbon atoms, an alkynyl group of 2 to 6 carbon atoms, a hydroxyalkyl group of 1 to 9 carbon atoms, a ketoalkyl group having a total of 3 to 15 carbon atoms, or an alkoxy alkyl group having a total of 2 to 20 carbon atoms.

Among the particular alkylene oxides that can be reacted with the triethylenediamine there are included: ethylene oxide, propylene oxide, styrene oxide, glycidol and longer chain alkylene oxides. Ethylene oxide and especially propylene oxide are preferred.

It is preferred that any one of a large variety of organic acids represented by general formula V may be used to furnish the anion of the desired quaternary salt of triethylenediamine.

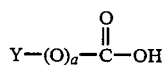   V

Where:

a is 0 or 1,

Y is hydrogen, an alkyl group of 1 to 20 carbon atoms, an alkenyl group of 2 to 15 carbon atoms, a cycloalkyl group of 3 to 6 carbon atoms, phenyl, an alkylphenyl having 1 to 9 carbon atoms in the alkyl group or groups attached to the phenyl ring, benzyl, an alkylbenzyl having 1 to 9 carbon atoms in the alkyl group or groups attached to the benzene ring, or a

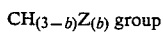

where:

b is 1 to 3 and Z is —OH, —CN, —Cl, an alkoxy group of 1 to 5 carbon atoms, a phenyl group of methoxyphenyl group, or Z is $(CH_2)_dCOOR_4$ wherein d is equal to 0 to 4 and $R_4$ is hydrogen or an alkyl group of up to 20 carbon atoms.

The preferred quaternary ammonium carbonylate salts for use in the catalyst system are those in which the acid is an organic carboxylic acid corresponding to the following general formula $R_8$—$CO_2H$ where $R_8$ is hydrogen, an alkyl group of 1 to 18 carbon atoms, an alkenyl group of 2 to 15 carbon atoms, benzyl or —$CH_2CN$.

Organic carboxylic acids of the above formula V include short to long chain fatty acids; substituted aliphatic acids; and aromatic carboxylic acids. Representative acids include formic, acetic, hexanoic, straight and branched chain heptanoic, octanoic, decanoic and hexadecanoic acids; neoacids such as 3,3-dimethyl butanoic acid; unsaturated aliphatic acids such as oleic, acrylic, methacrylic, undecenoic; aromatic acids such as benzoic, phenyl acetic and salicylic; and cyanoacetic and chloroacetic acids.

Hydroxypropylated triethylenediamine quaternary salts of formic acid and carboxylic acids having up to about 10 carbon atoms such as those of 2-ethylhexanoic and various decanoic acids are preferred.

In the usual method of preparation triethylenediamine, a carboxylic acid and an alkylene oxide are mixed, preferably in the presence of a suitable solvent such as dipropylene glycol, ethylene glycol or 1,4-butanediol. The alkylene oxide is used in excess of equimolar amounts with triethylenediamine, desirably in amounts ranging from 30 to about 200% excess on a molar basis, especially about a 100% molar excess. The reaction is carried out at a temperature in the range of 25°–60° C. and at about atmospheric pressure, although higher pressures may be employed, if desired.

The alkylene oxide and triethylenediamine should be reacted in the presence of no more than an equimolar amount of acid, based on triethylenediamine, preferably an equimolar amount. Greater amounts of acid form the disalt which is less active catalytically.

Where about two moles (100% molar excess) of alkylene oxide are reacted per mole of triethylenediamine the product mixture should substantially comprise the compounds depicted by formulas I and II. Using less than 2 moles of alkylene oxide per mole triethylenediamine would yield the above mixture also containing a quaternary compound of the following formula VI

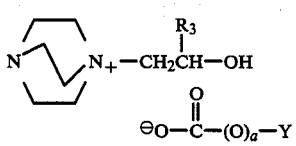

VI

A catalytically effective amount of the catalyst system of the invention is used in a polyurethane formulation comprising polyisocyanate, polyether or polyester polyol, water or other suitable blowing agent, and cell stabilizers such as silicone surfactants. More specifically, suitable amounts of the catalyst system may range from about 0.1 to 3 parts per 100 parts polyol in the polyurethane formulations.

Examples of suitable polyisocyanates are hexamethylene, diisocyanate, phenylene diisocyanate, toluene diisocyanate, and 4,4'-diphenyl methane diisocyanate. Especially suitable are the 2,4- and 2,6-toluene diisocyanates individually or together as their commercially available mixtures. Other suitable mixtures of diisocyanates are those known commercially as "crude MDI", also known as PAPI, which contain about 60% of 4,4'-diphenylmethane diisocyanate along with other isomeric and analogous higher polyisocyanates. Also suitable are "prepolymers" of these polyisocyanates comprising a partially pre-reacted mixture of polyisocyanates and polyether or polyester polyol.

Illustrative of suitable polyols as a component of the polyurethane formulations catalyzed by the catalyst systems of the invention are the polyalkylene ether and polyester polyols. The polyalkylene ether polyols include the poly(alkylene oxide) polymers such as poly(ethylene oxide) and poly(propylene oxide) polymers and copolymers with terminal hydroxyl groups derived from polyhydric compounds including diols and triols for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, cyclohexane diol and like low molecular weight polyols.

Useful polyester polyols include those produced by reacting a dicarboxylic acid with an excess of a diol for example, adipic acid with ethylene glycol or butanediol, or reacting a lactone with an excess of a diol such as caprolactone and propylene glycol.

Other typical agents found in the polyurethane formulations include blowing agents such as water, methylene chloride, trichlorofluoromethane and the like, and cell stabilizers such as silicones.

A general polyurethane formulation containing the triethylenediamine quaternary salt (TEDA QUAT) composition suitable for shoe soles would comprise one of the following:

| POLYETHER POLYURETHANE FORMULATION | |
|---|---|
| | pbw |
| Polyether Polyol | 100 |
| Crosslinker (butanediol) | 5–15 |
| Water | 0–0.4 |
| Cell Stabilizer | 0–0.3 |
| Halocarbon Blowing Agent | 2–8 |
| Organometallic Catalyst (dibutyltin dilaurate) | 0–0.1 |
| Tertiary Amine (Triethylenediamine) | 0.3–0.6 |
| TEDA QUAT | 0.03–0.12 |
| Isocyanate Prepolymer, free NCO % | 98–105 Index, 18–22% |

| POLYESTER POLYURETHANE FORMULATION | |
|---|---|
| | pbw |
| Polyester Polyol | 100 |
| Crosslinker (ethylene glycol) | 5–15 |
| Water | 0–0.5 |
| Cell Stabilizer | 0–1 |
| Tertiary Amine (Triethylenediamine) | 0.3–0.6 |
| TEDA QUAT | 0.03–0.25 |
| Isocyanate prepolymer, free NCO % | 96–104 Index, 18–22% |

A general rigid polyurethane formulation suitable for appliances would comprise the following:

| RIGID APPLIANCE POLYURETHANE FORMULATION | |
|---|---|
| | pbw |
| Polyol | 100 |
| Water | 0–2.0 |
| Cell Stabilizer | 0.7–2 |
| Halocarbon Blowing Agent | 20–55 |
| Tertiary Amine | 1–3 |
| TEDA QUAT | 0.04–0.2 |
| Isocyanate | 100–10 Index |

EXAMPLE 1

The following general procedure for the preparation of the carboxylic acid salt of hydroxypropylated triethylenediamine quaternary amine was essentially as taught in U.S. Pat. No. 4,040,992 except that greater than an equimolar quantity of the alkylene oxide was used. The other quaternary ammonium salts in the following examples were similarly prepared except that alkylene oxide was not added in excess of equimolar amounts.

A suitable amount of glycol solvent is charged to a reaction vessel equipped with stirrer, dropping funnel, condenser and heating mantle. One mole of the appropriate carboxylic acid (144 g for 2-ethyl hexanoic acid) is added. The reaction vessel is surrounded with a cooling bath (about 15° C.) and one mole of the amine (112 g triethylenediamine) is added. The reaction temperature is allowed to reach 25° C. whereupon greater than one mole of alkylene oxide (>58 g propylene oxide) is added to the reaction mixture. The catalyst composition according to the invention requires from greater than 0 to about 200% molar excess of the alkylene oxide be added to the reaction medium. Although the reaction is exothermic, it may be controlled by the slow addition of the alkylene oxide. After all the alkylene oxide has been added, the reaction temperature is maintained at about 40° C. for a period of time, preferably about 30 minutes.

In Examples 2–6 the triethylenediamine quaternary compound was prepared using an equimolar amount of propylene oxide. Example 7 shows the surprisingly greater activity of the quaternary compound prepared using greater than equimolar amounts of propylene oxide, i.e. reaction product contains a "bishydroxypropylated" quaternary compound, especially the composition prepared using a one molar excess of propylene oxide. Example 8 shows the use of a catalyst composition containing a major amount of a tertiary amine and a minor amount of triethylenediamine quaternary composition according to the invention.

EXAMPLE 2

A polyester polyol urethane shoe sole composition was prepared of the following ingredients in which various catalyst systems were used:

| POLYESTER POLYOL URETHANE SHOE SOLE COMPOSITION | |
|---|---|
| | pbw |
| WITCO E2456[a] | 100 |
| 1,4-BUTANEDIOL | 12 |
| WATER (added) | 0.3 |
| DC-193[b] | 0.2 |
| CATALYST | see TABLE 1 |
| ISONATE 240[c] | 98 Index |

[a] A polyester polyol having a hydroxyl number of 56 marketed by Witco Chemical Co.
[b] A silicone surfactant marketed by Dow Corning.
[c] 4,4'-diphenylmethane diisocyanate prepolymer having 18–19% free NCO marketed by Upjohn.

The catalyst system was mixed with the other components and the mixture stirred rapidly with a laboratory stirrer for 5 seconds, and the initiation time and "pinch" time was recorded. All times commenced when mixing began. The initiation time was visually observed as the moment the mixture began to rise. The cure was measured by recording the "pinch" time. This was determined by pinching a small piece of the risen polyurethane and vigorously pulling. Until the system had developed sufficient cure, the pinched piece tore away. When the cure was sufficiently developed, the pinched piece did not tear away and the system maintained its structural integrity. This time, directly indicative of cure, was recorded as the "pinch" time. The data is summarized in Table 1.

| | | POLYESTER POLYOL URETHANE FORMULATION | | |
|---|---|---|---|---|
| RUN | TERTIARY AMINE (php) | QUATERNARY AMMONIUM SALT (php) | INITIATION TIME (sec) | PINCH TIME (sec) |
| 1 | TEDA (0.55) | — | 13 | 68 |
| 2 | TEDA-EHA (0.72) | — | 12 | 69 |
| 3 | TEDA-2FA (0.57) | — | 15 | 110 |
| 4 | DMEA (6.0) | — | 8 | >200 |
| 5 | AP (7.0) | — | 10 | 77 |
| 6 | DMEA (3.15) | TEDA/EHA/PO (0.35) | 10 | >200 |
| 7 | BDMAEE (4.05) | TEDA/EHA/PO (0.45) | 8 | 69 |
| 8 | TEDA (0.425) | TEDA/EHA/PO (0.05) | 17 | 70 |
| 9 | TEDA (0.31) | TEDA/EHA/PO (0.075) | 22 | 67 |
| 10 | TEDA (0.40) | TEDA/CYAC/PO (0.10) | 17 | 70 |
| 11 | TEDA (0.44) | TEDA/CYAC/PO (0.225) | 16 | 68 |
| 12 | TEDA (0.425) | DMEA/EHA/PO (0.05) | 16 | 65 |
| 13 | TEDA (0.31) | DMEA/EHA/PO (0.075) | 16 | 68 |
| 14 | TEDA (0.31) | DMEA/CYAC/PO (0.075) | 17 | 70 |
| 15 | TEDA (0.275) | DMEA/CYAC/PO (0.15) | 21 | 65 |

AP - N,N,N', N'—2-Pentamethyl-1,2-propanediamine
BDMAEE - Bis (Dimethylaminoethyl) ether marketed as Dabco ® BL-19 catalyst by Air Products and Chemicals, Inc.
TEDA - Triethylenediamine marketed as Dabco ® crystal catalyst by Air Products and Chemicals, Inc.
DMEA - Dimethylethanolamine
EHA - 2-Ethylhexanoic Acid
CYAC - Cyanoacetic Acid
FA - Formic Acid
PO - Propylene Oxide
php - parts per hundred parts polyol From Table 1 can be seen that Run 1 using triethylenediamine (TEDA) as the sole amine catalyst in this control example showed an initiation time of 13 seconds and a pinch time of 68 seconds. Runs 2 and 3 which used the 2-ethyl hexanoate and formic acid salts of TEDA, respectively, showed no advantage in initiation time or pinch time in Run 2 and a delay in both initiation and pinch times in Run 3. In Runs 8–15 some of the TEDA was replaced by minor amounts of the cyanoacetic acid and 2-ethyl hexanoic acid salts of triethylenediamine-N-2-hydroxypropyl quaternary amine and of dimethyl-N-hydroxyethyl-N-2-hyroxypropyl quaternary amine. In each instance the initiation time was significantly delayed while the pinch time remained substantially the same as the control.

EXAMPLE 3

In Runs 16–28 a polyether polyol urethane shoe sole composition containing various amine catalysts was prepared of the following ingredients:

| POLYETHER POLYOL URETHANE SHOE SOLE COMPOSITION | |
|---|---|
| | pbw |
| Polyether Polyol[a] | 100 |
| 1,4-butanediol | 7 |
| Water (total) | 0.15 |

| POLYETHER POLYOL URETHANE SHOE SOLE COMPOSITION | |
|---|---|
| | pbw |
| Cl$_3$CF | 7 |
| DC-193 | 0.1 |
| T-12[b] | 0.01-0.02 |
| Mondur PF[c] | 100 Index |

[a] A polyether polyol having an average hydroxyl number of 30.
[b] Dibutyltin dilaurate catalyst marketed by M&T Co.
[c] 4,4'-diphenylmethane diisocyanate prepolymer having 21-22% NCO marketed by Mobay Chemical Co.

The appropriate data is summarized in Table 2.

| POLYESTER URETHANE SHOE SOLE COMPOSITION | |
|---|---|
| | pbw |
| WITCO E-2456 | 100 |
| 1,4-BUTANEDIOL | 12 |
| WATER (added) | 0.3 |
| DC-193 | 0.2 |
| CATALYST | See Table 3 |
| MONDUR E-501[a] | 100 Index |

[a] A polyisocyanate having about 18-19% NCO marketed by Mobay Chemical Co.

TABLE 3

| RUN | AMINE (php) | QUATERNARY AMMONIUM SALT (php) | INITIATION TIME (SEC) | PINCH TIME (SEC) |
|---|---|---|---|---|
| 29 | TEDA (0.55) | — | 13 | 120 |
| 70 | TEDA (0.51) | TEDA/EHA/PO (0.083) | 13 | 60 |

The data in Table 3 shows the effect of matching the initiation time of the control catalyst (Run 29) and substantially reducing the cure time (as measured by pinch time) by the use of a minor amount of quaternary ammonium salt with the tertiary amine, about 10-20 wt% based on tertiary amine, specifically about 16 wt% in Run 30.

EXAMPLE 5

This example demonstrates the ability to achieve both a substantially delayed initiation time and substantially faster cure time. The general formulation employed was the following:

| | pbw |
|---|---|
| Polyester Polyol (1,4-butanediol adipate) | 100 |
| 1,4-butanediol | 8-10 |
| Water | 0.2-0.3 |
| Silicone Surfactant | 0.5 |
| Catalyst | See Table 4 |
| Isocyanate Prepolymer, 19% NCO | 98 Index |

| | | POLYETHER POLYOL URETHANE FORMULATION | | |
|---|---|---|---|---|
| RUN | TERTIARY AMINE (php) | QUATERNARY AMMONIUM SALT (php) | INITIATION TIME (sec) | PINCH TIME (sec) |
| 16 | TEDA (0.50) | — | 19 | 65 |
| 17 | TEDA-OXALIC ACID (1.17) | — | 18 | 72 |
| 18 | AP (7.5) | — | 19 | 87 |
| 19 | DMEA (4.0) | — | 15 | 200 |
| 20 | — | DMEA/EHA/PO (3.0) | 19 | 66 |
| 21 | TEDA/DMAEM (0.5/0.5) | — | 16 | 70 |
| 22 | TEDA/DMAEM (0.8/2.5) | — | 18 | 83 |
| 23 | TEDA/AP (0.5/0.5) | — | 17 | 64 |
| 24 | TEDA (0.36) | DMEA/EHA/PO (0.06) | 23 | 64 |
| 25 | TEDA (0.36) | TMA/EHA/PO (0.06) | 23 | 69 |
| 26 | TEDA (0.36) | TEDA/EHA/PO (0.06) | 22 | 70 |
| 27 | DMEA (2.25) | TEDA/EHA/PO (0.25) | 20 | 200 |
| 28 | BDMAEE (2.70) | TEDA/EHA/PO (0.30) | 16 | 62 |

DMAEH - 4-(2-dimethlaminoethyl) morpholine marketed as Dabco XDM ® catalyst by Air Products and Chemicals, Inc.
TMA - Trimethylamine
EHA - 2-ethyl hexanoic acid Compared to the control Run 16 using TEDA as the sole amine catalyst Runs 17 and 21-23 using the oxalic acid salt of TEDA and blends of TEDA with other tertiary amines, respectively, showed a decrease in the initiation time and a delay in pinch time. This is the complete opposite of what is desired. Runs 24-26 according to the invention showed that a decreased amount of TEDA in combination with a minor amount of the indicated quaternary ammonium salt provided a significant delay in initiation time with no experimentally significant delay in pinch time in Runs 25 and 26.

EXAMPLE 4

This example shows the advantage of a significant decrease in pinch time while maintaining initiation time when using a catalyst system according to the invention in another typical polyester shoe sole formulation.

TABLE 4

| RUN | AMINE (php) | QUATERNARY AMMONIUM SALT (php) | INITIATION TIME (SEC) | PINCH TIME (SEC) |
|---|---|---|---|---|
| 31 | TEDA (0.5) | — | 9 | 162 |
| 32 | TEDA (0.278) | TEDA/EHA/PO (0.045) | 13 | 120 |
| 33 | TEDA (0.27) | TEDA/EHA/PO (0.06) | 15 | 92 |

TABLE 4-continued

| RUN | AMINE (php) | QUATERNARY AMMONIUM SALT (php) | INITIATION TIME (SEC) | PINCH TIME (SEC) |
|---|---|---|---|---|
| 34 | TEDA (0.45) | TEDA/EHA/PO (0.1) | 10 | 51 |

From Table 4 it can be seen that the control system of Run 31 was substantially improved by the addition of small amounts of quaternary ammonium salt in Runs 32 and 33 which employed a catalyst blend of TEDA and between 16–22 wt% of the quaternary ammonium salt, based on TEDA. In both cases the initiation time was extended, by 44% and 67% respectively, while the pinch time was shortened by 26% and 43%, respectively. In Run 34 the pinch time was decreased by 68% while achieving a delay in initiation of 10%.

In subsequent experiments involving other polyester and polyether shoe sole systems, it was determined that an amount of propylene oxide in excess of equimolar with the tertiary amine; i.e., about 100% excess, in the manufacture of the TEDA quaternary salt yielded the best reactivity results.

EXAMPLE 6

This example shows the application of the invention to a typical rigid appliance polyurethane foam formulation.

| RIGID APPLIANCE URETHANE COMPOSITION | |
|---|---|
| | pbw |
| PLURICOL 1009[a] | 100 |
| DC-193 | 1.5 |
| WATER | 0.5 |
| Cl₃CF | 40.0 |
| CATALYST | See Table 5 |
| MONDUR M-437[b] | 102 index |

[a]A polyol comprising a sucrose and amine blend having a hydroxyl number of 415 marketed by BASF
[b]A polyisocyanate prepolymer having 34% NCO marketed by Mobay Chemical Co.

The catalyst system was mixed with the other components and stirred for about 5 seconds, then discharged into a container of ample size. All times commenced with the beginning of the mixing. The initiation time was visually observed as the moment the mixture began to rise. The top of the rising foam was constantly tapped with the edge of a tongue depressor. The string gel time was recorded as the first time that "strings" formed between the foam and the tongue depressor. The tack free time was that time at which no foam stuck to a second tongue depressor.

TABLE 4

| | RIGID APPLIANCE URETHANE FORMULATIONS | | | | | |
|---|---|---|---|---|---|---|
| | TERTIARY AMINE (php) | | QUATERNARY AMMONIUM SALT (php) | TIME (seconds)[2] | | |
| RUN | DMEA | BDMAEE[1] | | INITIA-TION | GEL | TACK FREE |
| 35 | 1.615 | .248 | — | 5 | 29 | 58 |
| 36 | 1.535 | .236 | TMA/EHA/PO (.074) | 5 | 27 | 46 |
| 37 | 1.454 | .223 | TMA/EHA/PO (.148) | 5 | 25 | 49 |
| 38 | 1.535 | .236 | DMEA/FA/PO (.098) | 5 | 27 | 62 |
| 39 | 1.454 | .223 | DMEA/FA/PO (.197) | 5 | 27 | 55 |
| 40 | 1.535 | .236 | TEDA/EHA/PO (.049) | 6 | 29 | 51 |
| 41 | 1.454 | .223 | TEDA/EHA/PO (.098) | 6 | 27 | 52 |
| 42 | 1.535 | .236 | TMA/FA/PO (.049) | 5 | 29 | 63 |
| 43 | 1.454 | .223 | TMA/FA/PO (.098) | 5 | 30 | 54 |

[1]Bis(dimethylaminoethyl)ether marketed as Dabco BL-19 by Air Products and Chemicals, Inc.
[2]Average of runs Runs 36–39 of Table 4 show the decrease in gel time of a rigid appliance urethane composition using as the catalyst trimethyl-N-2-hydroxypropyl ammonium 2-ethylhexanoate and dimethyl-N-hydroxyethyl-N-2-hydroxypropyl ammonium formate. Runs 40, 41 and 43 show shorter tack free time while Runs 40–42 show the same or slightly longer initiation time.

EXAMPLE 7

This example shows the unexpected advantage in the use of a triethylenediamine quaternary 2-ethylhexanoate salt prepared using excess propylene oxide. Equimolar amounts of triethylenediamine and 2-ethylhexanoic acid were reacted with varying molar excess amounts of propylene oxide. The general formulation employed was the following:

U-235* Polyether Polyol Premix: 100 g
U-235: Isocyanate Prepolymer, free—NCO 22%, 100 Index,: 38 g.

*Marketed by Mobay Chemical Corp.

TABLE 5

| RUN | AMINE (pbw) | QUATERNARY AMMONIUM SALT (pbw) | % STOICHIOMETRIC EXCESS PO | INITIATION TIME (sec) | PINCH TIME (sec) | BOUNCE*** (sec) |
|---|---|---|---|---|---|---|
| 44 | TEDA (0.300) | — | — | 25 | 115 | 148 |
| 45 | TEDA (0.278) | TEDA/EHA/PO (0.045) | 10% | 26 | 126 | 165 |
| 46 | TEDA (0.278) | TEDA/EHA/PO (0.045) | 30% | 25 | 100 | 130 |
| 47 | TEDA (0.231) | TEDA/EHA/PO (0.038) | 100% | 30 | 117 | 105 |
| 48 | TEDA (0.278) | TEDA/EHA/PO (0.045) | 100% | 27 | 110 | 100 |
| 49 | TEDA (0.231) | TEDA/EHA/PO (0.038) | 200% | 32 | 99* | 130 |
| 50 | TEDA (0.278) | TEDA/EHA/PO (0.045) | 200% | 29 | 93** | 125 |

*Surface was irregular.
**Foam was characterized by surface splits.
***Measure of internal cure.

It can be seen that Runs 47-50 which employed a catalyst system comprising triethylenediamine quaternary salt prepared using one or two molar excess propylene oxide in combination with free triethylenediamine afforded a significant delay in initiation while maintaining or decreasing the pinch time and significantly decreasing the bounce time when compared to triethylenediamine by itself or in combination with the quaternary salt prepared with 10% excess propylene oxide. It is also evident from the data that the quaternary composition prepared using 100% molar excess propylene oxide surprisingly afforded both delayed initiation and reduced final cure time while yielding an acceptable product.

EXAMPLE 8

This example shows that the triethylenediamine quaternary composition according to the invention must be less than 50 wt% of the mixture with the tertiary amine. The polyester polyol formulation employed was the following:

|  | pbw |
| --- | --- |
| WITCO E-2457 polyol[a] | 88.7 |
| 1,4 Butanediol | 10.5 |
| Water | 0.4 |
| DC-193 surfactant | 0.4 |
| Catalyst | See Table 6 |
| ISONATE 240 prepolymer[b] | 98 Index |

[a]Hydroxyl number 55; mol wt 2000; functionality 2.0
[b]NCO 18%

The quaternary composition was prepared by reacting triethylenediamine with two molar equivalents of propylene oxide in the presence of one molar equivalent of 2-ethyl hexanoic acid in ethylene glycol.

TABLE 6

| RUN | TEDA (php) | TEDA QUAT (php) | TEDA QUAT(%)[a] | INITIATION TIME | TACK TIME | PULL TIME | BOUNCE TIME |
| --- | --- | --- | --- | --- | --- | --- | --- |
| 51 | 0.5 | — | — | 8 | 61 | 75 | 95 |
| 52 | 0.48 | 0.04 | 7.7 | 8 | 45 | 45 | 79 |
| 53 | 0.475 | 0.05 | 9.5 | 7 | 30 | 40 | 115 |
| 54 | 0.465 | 0.075 | 14.0 | 7 | 20 | 40 | 148 |
| 55 | 0.425 | 0.15 | 26.1 | 8 | 20 | 40 | >200[b] |

[a]% based on total TEDA + TEDA QUAT
[b]foam is "chunky"; i.e. poor physical properties Runs 51-55 demonstrate that small quantities of the quaternary composition in combination with triethylenediamine as the major component of the catalyst system significantly decreased the tack time and pull time. However, at greater than 25 wt% quaternary composition in the catalyst system the foam product in this formulation had unacceptable physical properties.

STATEMENT OF INDUSTRIAL APPLICATION

The invention provides delayed action/enhanced cure catalyst systems for polyurethane compositions that can delay the initiation time of the urethane reaction while maintaining the cure time, or maintain the initiation time while decreasing the cure time, or both, by varying the amount of the catalyst system used.

We claim:

1. A catalyst composition for the catalysis of the isocyanate/polyol reaction comprising a quaternary triethylenediamine composition prepared by reacting triethlenediamine with two molar equivalents of ethylene or propylene oxide in the presence of an acid of the formula H—A where A is the salt forming anionic portion of the acid HA.

2. The catalyst composition which consists essentially of a tertiary amine and 3 to 25 wt%, based on tertiary amine, of a quaternary triethylenediamine composition of claim 1.

3. A catalyst composition comprising a quaternary triethylenediamine compound prepared by reacting triethylenediamine with 2 molar equivalents of an alkylene oxide of the formula

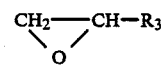

in the presence of an organic carboxylic acid of the formula $$Y-(O)_a-CO_2H$$

where
$R_3$ is hydrogen, phenyl, an alkyl group of 1 to 15 carbon atoms, an alkenyl group of 2 to 15 carbon atoms, an alkynyl group of 2 to 6 carbon atoms, a hydroxyalkyl group of 1 to 9 carbon atoms, a ketoalkyl group having a total of 3 to 15 carbon atoms, or an alkoxy alkyl group having a total of 2 to 20 carbon atoms;
$a$ is 0 or 1;
Y is hydrogen, an alkyl group of 1 to 20 carbon atoms, an alkenyl group of 2 to 15 carbon atoms, a cycloalkyl group of 3 to 6 carbon atoms, phenyl, an alkylphenyl having 1 to 9 carbon atoms in the alkyl group or groups attached to the phenyl ring, benzyl, an alkylbenzyl having 1 to 9 carbon atoms in the alkyl group or groups attached to the benzene ring, or a $CH_{(3-b)}Z_{(b)}$ group wherein
$b$ is 1 to 3 and Z is —OH, —CN, —Cl, an alkoxy group of 1 to 5 carbon atoms, a phenyl group or methoxyphenyl group, or
Z is $(CH_2)_dCOOR_4$ wherein $d$ is equal to 0 to 4 and $R_4$ is hydrogen or an alkyl group of up to 20 carbon atoms.

4. A catalyst composition consisting essentially of a tertiary amine and 1 to 35wt%, based on tertiary amine, of a quaternary triethylenediamine composition of claim 3.

5. The catalyst composition of claim 3 in which $R_3$ is hydrogen or methyl and the organic carboxylic acid has the general formula $R_8CO_2H$ where $R_8$ is hydrogen, an alkyl group of 1 to 18 carbon atoms, an alkenyl group of 2 to 15 carbon atoms, benzyl or —CH$_2$CN.

6. The catalyst composition of claim 4 in which $R_3$ is hydrogen or methyl and the organic carboxylic acid has the general formula $R_8CO_2H$ where $R_8$ is hydrogen, an alkyl group of 1 to 18 carbon atoms, an alkenyl group of 2 to 15 carbon atoms, benzyl or —CH$_2$CN.

7. The catalyst composition of claim 4 in which the tertiary amine is triethylenediamine.

8. The catalyst composition of claim 3 in which the alkylene oxide is ethylene oxide or propylene oxide.

9. The catalyst composition of claim 4 in which the anlkylene oxide is ethylene oxide or propylene oxide.

10. The catalyst composition of claim 3 in which the alkylene oxide is propylene oxide.

11. The catalyst composition of claim 4 in which the alkylene oxide is propylene oxide.

12. The catalyst composition of claim 9 in which the tertiary amine is triethylene diamine.

13. The catalyst composition of claim 11 in which the tertiary amine is triethylene diamine.

14. The catalyst composition of claim 8 in which the carboxylic acid is 2-ethyl hexanoic acid.

* * * * *